United States Patent [19]

Stirbl et al.

[11] Patent Number: 5,415,156

[45] Date of Patent: * May 16, 1995

[54] METHOD USING SOLAR ENERGY

[76] Inventors: Robert C. Stirbl; Peter J. Wilk, both of New York, N.Y.

[*] Notice: The portion of the term of this patent subsequent to Dec. 14, 2010 has been disclaimed.

[21] Appl. No.: 166,477

[22] Filed: Dec. 13, 1993

Related U.S. Application Data

[63] Continuation-in-part of Ser. No. 70,680, Jun. 2, 1993, Pat. No. 5,269,288.

[51] Int. Cl.$^6$ ............................................... F24J 2/08
[52] U.S. Cl. ................................... 126/714; 126/698; 126/683; 219/121.85
[58] Field of Search ............... 126/593, 683, 698, 700, 126/714; 219/121.74, 121.85, 121.6

[56] References Cited

U.S. PATENT DOCUMENTS 4,307,711 12/1981 Doundoulakis ..................... 126/698
5,269,288 12/1993 Stirbl et al. ......................... 126/593

Primary Examiner—Carroll B. Dority
Attorney, Agent, or Firm—R. Neil Sudol; Henry D. Coleman

[57] ABSTRACT

A police or military method utilizes a laser source for emitting, along a preselected path, radiation having a wavelength absorbable by at least one type of atmospheric molecule. Radiation directing components such as lenses or deformable mirror segments are disposed in the transmission path for directing the laser radiation from the source to a predetermined target region of the atmosphere located a pre-established distance above a surface of the earth. Control componentry is operatively connected to the directing components for controlling the operation thereof to modulate an index of refraction of air in the predetermined atmospheric target region to produce in that region a predetermined refractive index pattern such as an atmospheric Fresnel lens for concentrating incoming solar radiation on a preselected military or police target such as a tank, a submarine or ship, a missile silo, a munitions factories, or an armament stores. The control componentry is operatively connected to the laser source for timing the emission of radiation therefrom. Sensors are provided for detecting the distribution of the radiation concentration by the atmospheric lens. Feedback circuitry is operatively connected to the sensors and to the beam directing components for modifying the operation thereof in response to signals from the sensors to compensate in real time for changes in atmospheric refractive index arising from atmospheric turbulence, thereby optimizing concentration of solar radiation by the atmospheric region onto the military or police target.

22 Claims, 4 Drawing Sheets

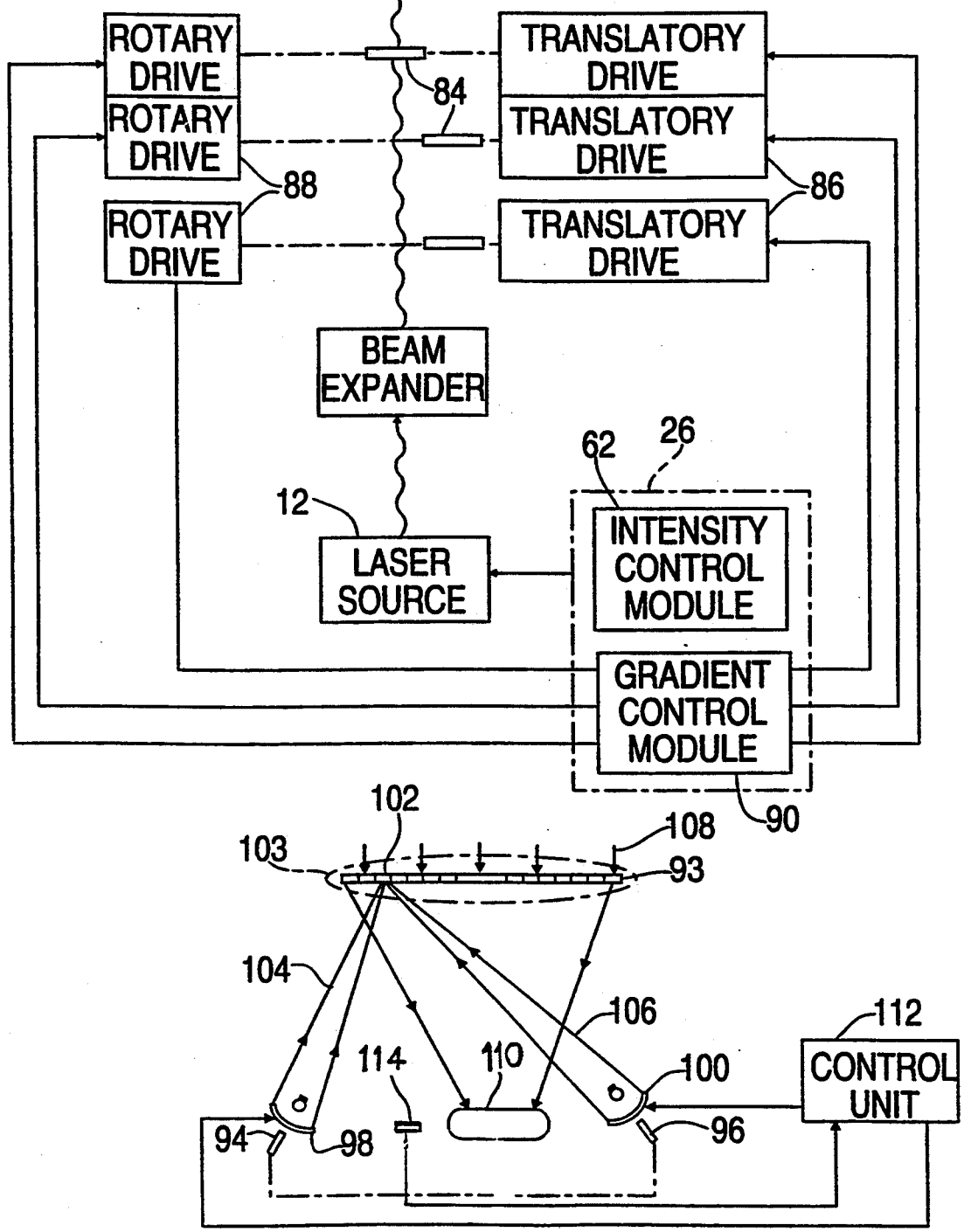

METHOD USING SOLAR ENERGY

This application is a continuation-in-part of U.S. patent application Ser. No. 08/070,680 filed Jun. 2, 1993, now U.S. Pat. No. 5,269,288.

BACKGROUND OF THE INVENTION

This invention relates to a method for concentrating solar energy. More particularly, this invention relates to a method which generates a temporary lens to concentrate solar energy at a predeterminable location generally on the earth's surface.

U.S. Pat. No. 5,269,288 is directed to a method for collecting solar energy, comprising the steps of (a) generating waveform energy, (b) directing the energy to a predetermined region of the atmosphere located a pre-established distance above a surface of the earth, (c) controlling the step of directing to modulate an index of refraction of air in the predetermined region of the atmosphere to produce a predetermined refraction index pattern in that region, (d) modifying the distribution of solar radiation passing through the atmospheric region to thereby concentrate the solar radiation at a predetermined location on the surface of the earth, and (e) absorbing, at that location, a substantial quantity of the concentrated solar radiation to produce heat energy.

The directed waveform energy is preferably electromagnetic radiation which, in one embodiment, is generated by operating a laser. The modulation control is effectuated by concentrating the laser generated radiation differentially through the atmospheric region.

The refractive index modulation is accomplished primarily by differential heating of the air in the predetermined region of the atmosphere. However, it is also possible that the modulation is accomplished in whole or in part by ionizing the air within the target region.

The atmospheric index profile in the target region may be modulated so as to produce a solar energy concentrator in the form of an atmospheric lens. More specifically, the index of refraction may be modulated so as to produce an atmospheric index profile approximating a Fresnel or alternate distribution lens.

The atmospheric lens generating capability disclosed in U.S. Pat. No. 5,269,288 suggests a certain power which may be put to effective uses other than the generation of electrical energy. One such use is defensive or military.

Extensive efforts have been undertaken recently to develop strategic quick-reaction tactical and military defense operating systems utilizing, for example, high-power laser energy focused to incapacitate/destroy boosting tactical or incoming intercontinental ballistic missiles upon launching thereof. Laser generating equipment of sufficient power is most easily disposed on the earth's surface, rather than, for example, on a balloon, a satellite or an aircraft. Such earth bound equipment can be used, however, only for destroying military targets in the air. It will obviously be incapable of effectively neutralizing earthbound military targets such as submarines and ships, missile silos, airports, train stations, munitions factories, armament stores, telecommunications centers, etc., unless expensive orbiting fighting and relaying mirrors are employed.

OBJECTS OF THE INVENTION

An object of the present invention is to provide a method for concentrating solar radiation to neutralize (incapacitate or destroy) military or police type targets.

Another, more particular, object of the present invention is to provide such a method which controls the atmospheric index of refraction profile within a predetermined region of the earth's atmosphere to thereby redistribute incoming solar radiation so as to concentrate the radiation at a pre-established military target, for example, on the earth's surface.

A further particular object of the present invention is to provide such a method which at least partially compensates for atmospheric turbulence.

Yet another particular object of the present invention is to provide such a method in which atmospheric turbulence is compensated in real time via a feedback loop.

Another object of the present invention is to provide such a method in which the energy required to generate the atmospheric solar radiation concentrator is less than the energy derived or collected from the concentrated solar radiation.

These and other objects of the present invention will be apparent from the drawings and detailed descriptions herein.

SUMMARY OF THE INVENTION

A method for collecting solar energy, comprising the steps of (a) generating waveform energy, (b) directing the energy to a predetermined region of the atmosphere located a preestablished distance above a surface of the earth, (c) controlling the step of directing to modulate an index of refraction of air in the predetermined region of the atmosphere to produce a predetermined refraction index pattern in that region, (d) modifying the distribution of solar radiation passing through the atmospheric region to thereby concentrate the solar radiation at a preselected military or police target on the earth's surface, and (e) executing the steps of generating, controlling and modifying to control the total amount of solar radiation concentrated at the target to effectively disable the target.

The disabling of the target may only require heating the target to a temperature sufficiently high to force the evacuation of any personnel in the target. Where the target is a tank or a ship or even an aircraft on an airport runway, the evacuated personnel include operators of the target. Of course, the intensity of the radiation concentrated on the target may be great enough to incapacitate the target by destroying one or more key components of the target. Where the military or police target is primarily human beings, for example, an infantry column, the target may be neutralized or incapacitated by concentrating only that amount of solar energy required to temporarily blind the soldiers.

In some circumstances, it may not be necessary for the concentrated solar radiation to fall on the target itself. The radiation may fall on a region about the target and affect that region so as to neutralize the target object. Where the target is a submarine, an incapacitating amount of heat may be transmitted to the submarine from water which has absorbed the concentrated solar radiation above and around the submarine.

According to another feature of the present invention, the waveform energy is electromagnetic radiation which is generated by operating a laser. The modulation control is effectuated by concentrating the laser generated radiation differentially through the atmospheric region.

The refractive index modulation is accomplished primarily by differential heating of the air in the predetermined region of the atmosphere. However, it is also possible that the modulation is accomplished in whole or in part by ionizing the air within the predetermined atmospheric region.

The atmospheric index profile in the predetermined atmospheric may be modulated so as to produce a solar energy concentrator in the form of an atmospheric lens. More specifically, the index of refraction may be modulated so as to produce an atmospheric index profile approximating a Fresnel or alternate distribution lens. It is to be noted that the lens may be of virtually any size, whereby the lens may be adapted to the destructive power requirements of the particular military or police target. Incapacitating a battleship, for example, may call for a larger lens than neutralizing a tank. However, it is to be noted, that several interspaced atmospheric lenses may be generated, focusing the sun's energy onto the same target.

According to one embodiment of the present invention, laser radiation is transmitted from a plurality of different sources to the atmospheric region. Accordingly, a plurality of lasers may generate different portions of the same concentrator or lens.

It is to be noted that an atmospheric solar concentrator generated in accordance with the present invention will be effective even if the lens is partial or imperfect. It is only necessary that incoming solar radiation be concentrated onto a target area. It is not necessary to produce an atmospheric lens capable of image formation. Accordingly, in this specification, the term "atmospheric lens" is used to mean an atmospheric index of refraction profile capable of concentrating incoming solar radiation onto a target area. Generally, the target is located on the earth's surface. However, it is possible to use the instant invention to neutralize an airborne target such as an intercontinental ballistic missile. The target may even be a satellite in orbit around the earth.

Concomitantly, it is contemplated that the one or more directed energy sources or lasers which generate the atmospheric lens are located on the earth's surface. However, it is also within the contemplation of the invention that a lens generating directed source or laser is carried on sea-goign craft or boat, a balloon, airship, airplane or satellite.

Where there is a plurality of laser sources, the laser radiation may be simultaneously transmitted from those sources to the same point in the predetermined atmospheric target region. Thus, in this embodiment of the invention, each laser in itself generates insufficient energy to ionize or substantially heat the air, while the energy from a plurality of lasers, when converging or crossing at the same target point in the atmosphere, will be sufficient to heat or ionize the air to change the index of refraction at that point. The laser sources may be phase locked to enable and optimize energy collection at the target point.

It is to be noted that the energy density of the individual laser beams may be decreased to a tolerable level (a level insufficient to ionize) by so called beam expanders.

If a single beam of laser radiation is sufficiently powerful to modulate the index of refraction of air, that beam's radius is preferably enlarged or expanded prior to transmission through the atmosphere. In addition, the beam is acted upon by wavefront modulating elements, lenses and/or mirrors, to cause a convergence of the energy beam so that it is focused at a preselected point in the atmospheric target region. Of course, if several beams are used, one or more of them may be subjected to expansion and focusing steps.

According to another feature of the present invention, one or more lens generating energy or laser beams are swept along a predetermined path through the atmospheric target region. This procedure is especially effective in the event that the atmospheric lens is a Fresnel or alternate distribution lens. To generate each zone of the Fresnel lens, a laser beam distribution profile may be formed with a power gradient, the beam having a corresponding gradient at the region of the lens being generated.

Preferably, to optimize the concentration of solar radiation, adaptive optics is utilized to compensate for changes in atmospheric refractive index arising from atmospheric turbulence in the target region of the atmosphere. In general, adaptive optics is used in a feedback loop to compensate for variations in the atmospheric refractive index profile in real time. More particularly, a spatio-temporal Fourier transform of an instantaneous atmospheric refractive index profile is iteratively measured for the atmospheric region at a pre-established sensing area, and in response to the measured profile, the intensity of laser radiation transmitted to the atmospheric region is varied. The turbulence compensation may be implemented by iteratively changing piston-and-tilt orientations of a plurality of adaptively deformable mirror segments disposed in a radiation transmission path between a laser and the target region in the atmosphere.

A system for use in implementing a method in accordance with the present invention comprises a source for emitting, along a preselected path, radiation having a wavelength absorbable by one or more atmospheric molecules (e.g., water, carbon dioxide, oxygen, nitrogen, etc.). Radiation directing components such as phase-shifting lenses or adaptively deformable mirror segments are disposed in the transmission path for directing the radiation from the source to a predetermined target region of the atmosphere located a pre-established distance above a surface of the earth. Control componentry is operatively connected to the directing components for controlling the operation thereof to modulate an index of refraction of air in the predetermined target region of the atmosphere to produce in that region a predetermined refractive index pattern for concentrating incoming solar radiation on a military or police target. The control componentry is operatively connected to the source for timing the emission of radiation therefrom. Sensors may be provided for detecting the effectiveness of the radiation concentration by the atmospheric lens. Adaptive optics feedback circuitry and software is operatively connected to these sensors and to the directing components for modifying the operation thereof in response to signals from the sensors to compensate in real time for atmospheric refractive index changes arising from atmospheric turbulence, if necessary, thereby optimizing concentration of solar radiation by the atmospheric region onto the military or police target.

A method in accordance with the present invention provides a weapon of tremendous power and versatility. The power is that of the sun. One or more atmospheric lenses of virtually any selectable total area may be generated simultaneously to concentrate solar energy from a huge area onto a relatively small target. The lenses may be generated with transportable erectable laser stations carried, for example, on trucks like ICBM transportable launchers. Aiming can be facilitated with location input gathered by inertial guidance systems or inexpensive observational satellites in orbit around the earth.

Significant solar energy can be concentrated even if the atmospheric lens is only twenty or thirty feet in diameter and is located two or three hundred feet above the earth's surface. The amount of energy passing through the cross-section of such a lens and which is concentrated onto the designated spot can be readily calculated. Of course, greater amounts of solar energy may be concentrated by increasing the size of the atmospheric lens and/or the distance of the lens from the surface of the earth.

Different spaced lenses or lens segments may be simultaneously generated for concentrating solar energy on the same area. Lenses may be generated successively in different regions of the atmosphere, thereby allowing for atmospheric relaxation before further attempts at index modulation.

BRIEF DESCRIPTION OF THE DRAWING

FIG. 5 is a block diagram illustrating a modification of the system of FIG. 3 or 4.

FIG. 6 is a diagram of yet another embodiment of the system of FIG. 1.

DETAILED DESCRIPTION

Figure 1:
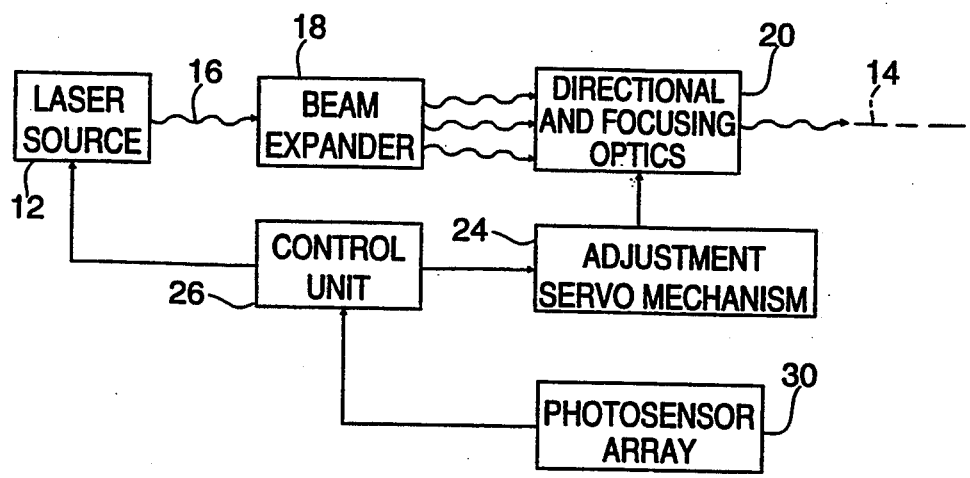
FIG. 1 is a block diagram of a system in accordance with the present invention for generating a predetermined refractive index pattern in a predetermined target region of the atmosphere for purposes of concentrating incoming solar radiation on a military or police target.

As illustrated in FIG. 1, a system for concentrating solar radiation comprises a directed energy source such as a laser source 12 for emitting, along a schematically represented preselected path 14, laser radiation 16 having a wavelength absorbable by at least one type of atmospheric molecule. Because the power of laser beam or radiation 16, when emitted from a single source 12, must be sufficiently high to substantially heat or even ionize air, the beam must be expanded by a beam expander 18 prior to transmission through the atmosphere to a target region.

As further illustrated in FIG. 1, radiation directing and focusing optics 20 such as lenses or mirrors (see FIGS. 3 and 4) are disposed in the transmission path 14 for directing the radiation from source 12 to a predetermined atmospheric target area 22 (FIG. 2) located a pre-established distance d1 above the earth. A servomechanism assembly 24 responsive to a control unit 26 is operatively connected to the radiation directing and focusing optics 20. Under the control of unit 26, servomechanism assembly 24 adjusts the operation of optics 20 to modulate an index of refraction of air in target region 22 to produce in that region a predetermined refractive index pattern or profile for concentrating incoming solar radiation on a preselected military or police target 28 (FIG. 2).

In subsequent cycles of operation of the system of FIG. 1, when the index of refraction in predetermined atmospheric area 22 is again modulated to regenerate the desired refractive index pattern or profile, control unit 26 receives feedback from a photosensor array 30 and, in response to that feedback, adjusts the transmission of laser radiation 16 to compensate for atmospheric turbulence in target region 22, as well as in an underlying air volume.

Control unit 26 may be operatively connected to source 12 for timing the emission of radiation therefrom. Thus, source 12 may be energized only during operating cycles of the index modulation system of FIG. 1.

Figure 2:
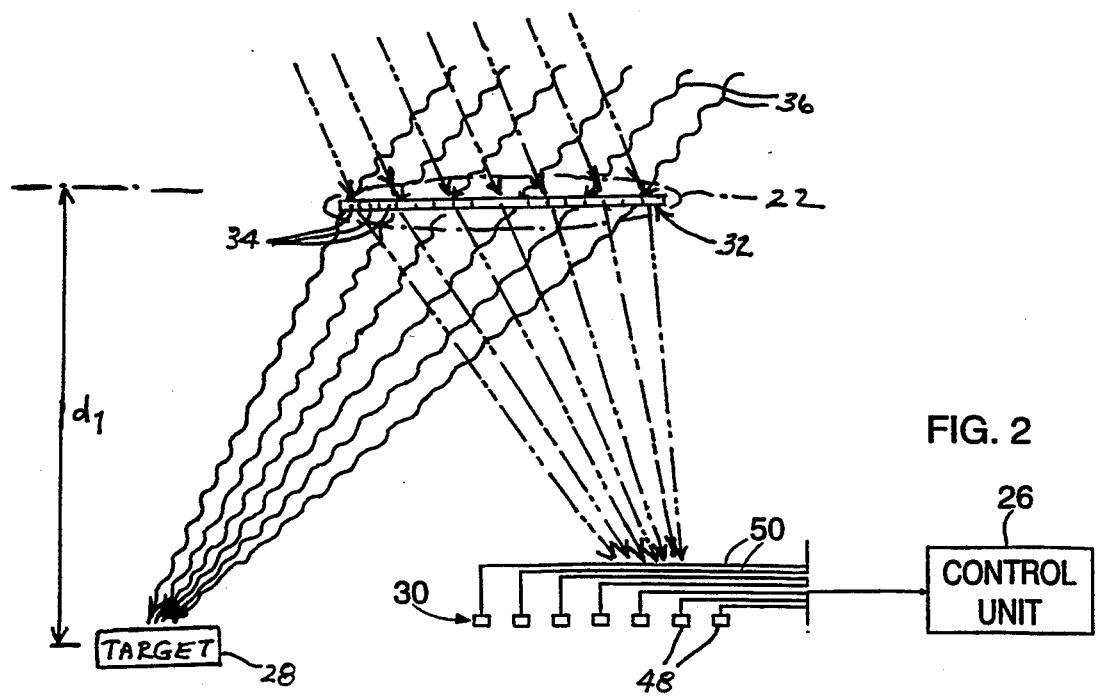
FIG. 2 is a diagram showing an atmospheric Fresnel lens generated by the system of FIG. 1 and further showing a solar energy collector and a photosensor array illustrated in FIG. 1.

As illustrated schematically in FIG. 2, the index modulation system of FIG. 1 acts to generate in target region 22 an atmospheric Fresnel lens 32 having a plurality of generally concentric zones 34 disposed in a generally planar array. Lens 32 is effective to concentrate incoming solar radiation 36 on military or police target 28. Target 28 may be, for example, a submarine or ship, a missile silo, an airport or airplane, a train station, a munitions factory, an armament store, or a telecommunications center. The amount of solar energy concentrated upon target 28 for disabling the target may be a minimum amount required to force evacuation of operating personnel from the target. Alternatively, the concentrated solar radiation may be sufficient to destroy at least key components of the target.

Photosensor array 30 includes a multiplicity of photoelectric sensors 48 disposed in a planar array, as indicated in FIG. 2. Generally, photosensor array 30 may be mounted on a mobile transport vehicle with the other components illustrated in FIG. 1. Alternatively, particularly in defensive uses of the system of FIG. 1, components of the system may be stationary relative to the earth. Photosensors 48 serve essentially to detect the distribution of light concentrated by lens 32 onto the photosensors from a distant object (other than the sun). This calibration object can be a planet, the moon, a satellite, a marker balloon, a point-source carrying airplane. Feedback circuits 50 operatively connect sensors 48 to control unit 26 which functions via servomechanism assembly 24 to modify the operation of optics 20 in response to signals from the sensors to compensate in real time for changes in atmospheric refractive index caused by turbulence. This feedback loop serves therefore to optimize the concentration of solar radiation by lens 32 onto military or police target 28.

Figure 3:
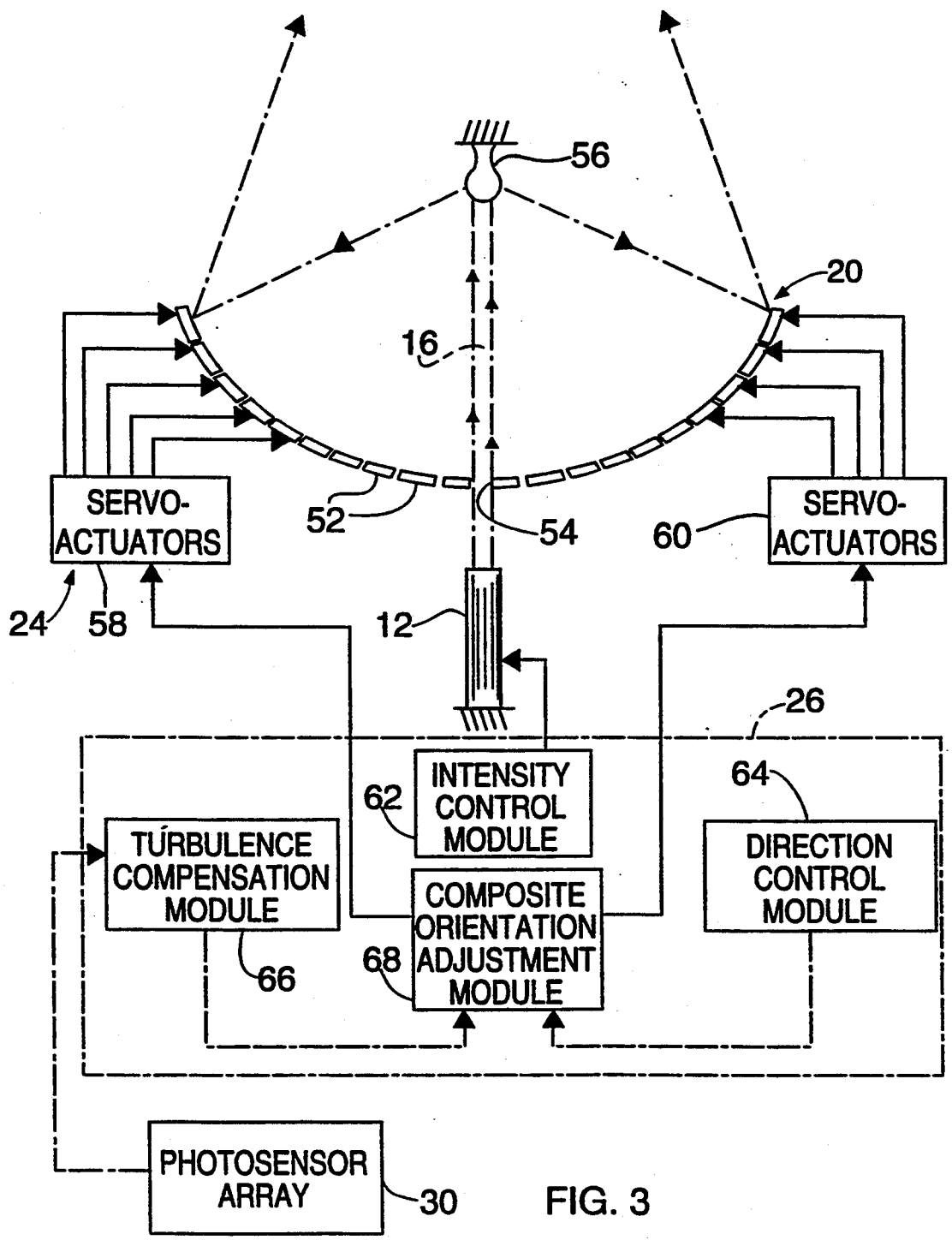
FIG. 3 is a diagram showing a specific embodiment of components illustrated in FIG. 1 including a control unit, directional and focusing optics, and a servomechanism assembly for adjusting the optics.

As shown in FIG. 3, optics 20 includes a plurality of deformable mirror segments 52 disposed in an aspheric concave array in the general surface form of a paraboloid. The deformable mirror array is formed with an aperture 54 through which laser beam 16 passes from laser source 12. Beam 16 is expanded by a convex mirror 56 disposed essentially at the focal point of mirror or mirror segments 52. Mirror 56 thus performs in part the function of beam expander 18 (FIG. 1). Mirror 56 also performs part of the directing function of optics 20.

As additionally shown in FIG. 2, servomechanism assembly 24 (FIG. 1) includes banks of servomechanism actuators 58 and 60 operatively linked to mirror or mirror segments 52 (or to mirror actuators). Generally, each mirror 52 will have one or more dedicated servo-actuators 58, 60 in the form, for example, of piezoelectric crystals. Actuators 58 and 60 function to control the instantaneous orientations of individual deformable mirror segments 52.

Control unit 26 includes a first module 62 for controlling the intensity of energy emitted from laser source 12. In particular, intensity control module 62 determines the times that laser source 12 is actively emitting laser radiation. Control unit 26 also includes a direction control module 64 for determining the orientations of mirror segments 52 necessary to sweep out zones 34 of Fresnel lens 32 (FIG. 2). In response to signals from control module 64, servo-actuators 58 and 60 tilt mirror segments 52 so that the expanded beam from mirror 56 converges to a predetermined point in the atmospheric target region 22 (FIG. 2). That point shifts in time, for example, along an arc defining a zone 34 of lens 32.

Control unit 26 additionally includes a turbulence compensation module 66 which is operatively connected to servoactuators 58 and 60 for controlling the operation thereof to adjust the orientation of mirror segments 52 (or mirror actuators) in response to signals from photosensors 48 (FIG. 2) to compensate in real time for changes in atmospheric refractive index induced by turbulence in predetermined atmospheric region 22. Turbulence compensation module includes circuitry or programming for controlling servo-actuators 58 and 60 to iteratively change the orientations of mirror segments 52.

Direction control module 64 and turbulence compensation module 66 are coupled at their outputs to a further module 68 serving to adjust or fine tune the mirror wavefront operations determined by direction control module 64 in accordance with the compensation requirements determined by module 66. Module 68 is connected to servo-actuators 58 and 60 to modify the orientations and positions of mirror segments 52 (or mirror actuators) to produce atmospheric Fresnel lens 32.

Intensity control module 62, direction control module 64 and composite orientation and position adjustment module 68, as well as turbulence compensation module, may be configured by hard wired circuits and/or specialized programming of a general purpose computer. In the event that the functions of modules 62, 64, 66 and 68 are programmed, the programming is a straightforward technical exercise for one of ordinary skill in the art of adaptive optics. Adaptive optics is used, for example, in astronomy, to adjust the orientations of the multiple individual deformable sections of segmented telescope mirrors to compensate in real time for atmospheric refractive index changes caused by turbulence and thereby obtain clear images of stellar bodies. The operation of turbulence compensation module 66 is essentially an operation in adaptive optics. Photosensor array 30 provides the feedback necessary to control instantaneous mirror orientation.

Figure 4:
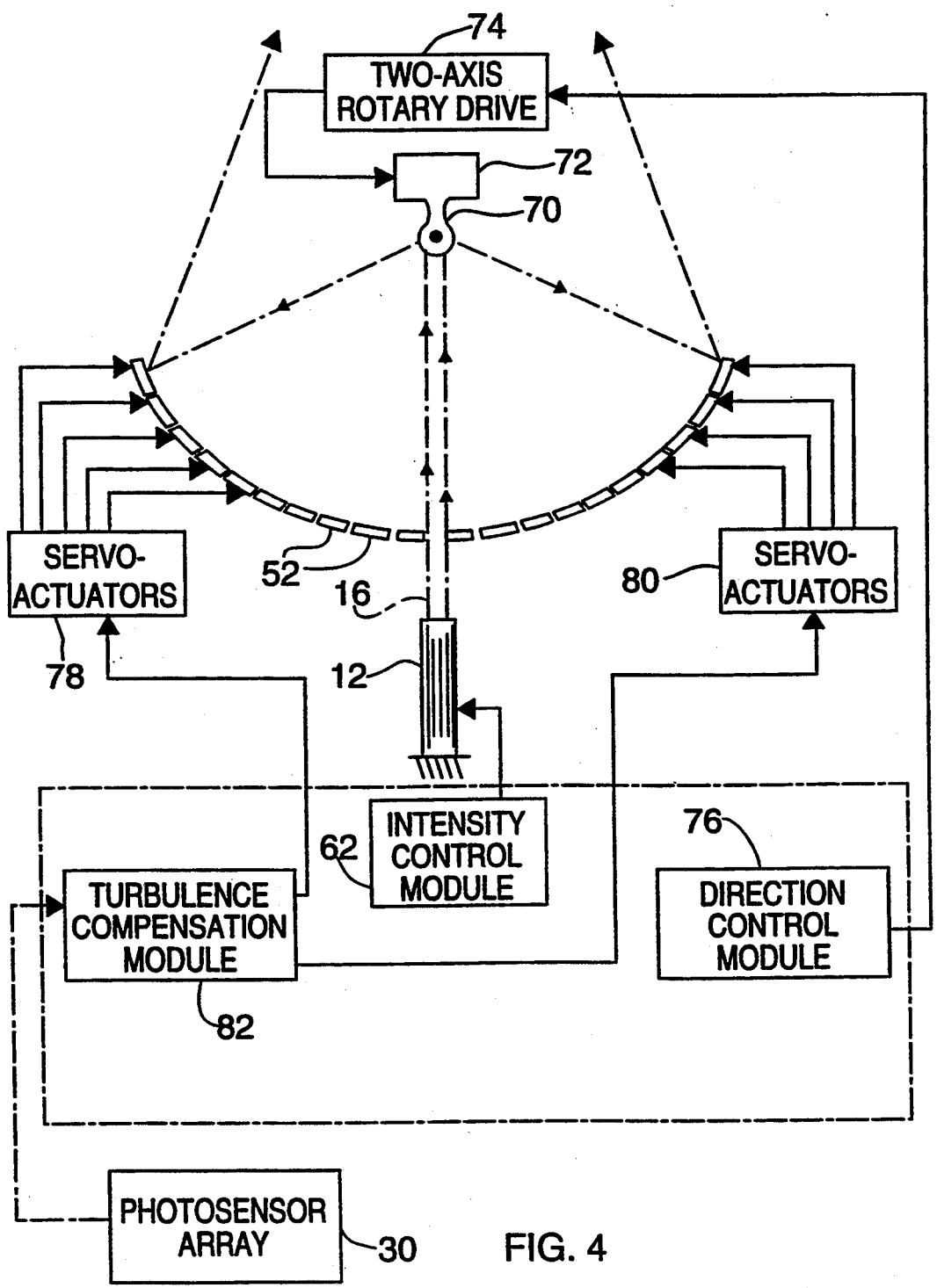
FIG. 4 is a diagram similar to FIG. 3 depicting an alternative embodiment of components illustrated in FIGS. 1 and 3.

In FIGS. 3 and 4, the same structures bear like reference designations. The embodiment illustrated in FIG. 4 separates, in optics 20, the turbulence compensation function from the overall directional function. Accordingly, a beam expanding mirror 70 is connected to a rotary carrier 72 which is operatively coupled to a two-axis rotary drive 74. Drive 74 is activated by a direction control module 76 which functions similarly to module 64 in the embodiment of FIG. 3. Via rotary carrier 72, control module 76 rotates mirror 70 in coordination with the emission of varying radiation intensities from laser source 12.

In the embodiment of FIG. 4, servo-actuators 78 and 80 are connected to respective deformable mirror segments 52 for adjusting the orientations thereof in response to signals from a turbulence compensation module 82 which functions similarly to corresponding module 66 in FIG. 3 to instantaneously compensate for the effects of atmospheric turbulence as detected by photosensor array 30.

Photosensors 48 cooperate with turbulence compensation module 66 or 82 to determine the sharpness or degree of concentration of the incoming solar energy. To that end, sensor array 30 advantageously extends over an area larger than the designated area 46 of impingement of the incoming concentrated solar radiation. Turbulence compensation module 66 or 82 uses signals from photosensors 48 to determine whether solar radiation is falling only on the designated target area 46 or is falling outside the designated area.

As in all Fresnel lenses, zones 34 of Fresnel lens 32 have different refractive index gradients depending on the distance of the respective zones from the center of the respective lens. In one mode of operation, laser beam 16 can be used to sweep out a single zone 34 in a single pass. To achieve that end, it is necessary to provide beam 16 with a gradient corresponding to the gradient of the particular lens zone 34. As illustrated in FIG. 5, a plurality of passive or active phase filters 84 having respective power gradients are alternately disposable in the path of beam 16. Each filter 84 is an electronically constructed transform filter or a holographic phase filter connected to a respective linear or angular drive 86 for translating or reciprocating the filter with respect to the beam path. In addition, to account for the curvature of lens zones 34 about the center of lens 32, filters 84 are coupled with respective rotary drives 88. Upon insertion of a selected filter 84 into the beam path by the respective drive 86, the respective rotary drive 88 rotates the filter at a respective predetermined angular velocity.

Drives 86 and 88 are controlled by a gradient module 90 in control unit 26. In the event that the intensity of laser radiation 16 produced by source 12 is too great for ensuring the continued integrity of filters 84, beam 16 may be reimaged at a lower energy density by a beam expander 92 positioned upstream of filters 84. Filters 84 are in turn interdisposed upstream (or upbeam) of mirror segments 52.

FIG. 6 depicts a modified system for generating an atmospheric Fresnel lens 93. A plurality of laser sources 94 and 96 are connected to one another via a phase-locking link 98. Each source 94 and 96 is provided with its own radiation directing and focusing optics 98 and 100.

As in other specific military or police applications in accordance with the present invention, sources 94 and 96 may be fixed to the earth's surface or may be mounted to vehicles. In the latter case, it is contemplated that the vehicles are stationary during operation of the atmospheric lens generating equipment. However, in some applications, it may not be necessary to fix the laser sources to the earth's surface. For example, the sources may be disposed in a plane or satellite, as discussed elsewhere herein.

As illustrated in FIG. 6, in one mode of operation, laser radiation is transmitted simultaneously from sources 94 and 96 to the same convergence point 102 in an atmospheric target region 104. Owing to the phase locking of laser sources 94 and 96, the intensities of beams 104 and 106 from those sources can be adjusted to add at the convergence point 102 to generate sufficient energy to ionize or substantially heat the air at that point.

FIG. 6 shows beams 104 and 106 as expanded beams being focused to convergence point 102 by the respective optics 98 and 100. However, it is possible to dispense with optics 98 and 100, provided that laser sources 94 and 96 produce laser radiation which is insufficiently intense to significantly heat or ionize the atmosphere prior to convergence of beams 104 and 106 at point 102. Only when beams 104 and 106 cross or converge at point 102 do they have sufficient energy to significantly change the index of refraction of the air.

Fresnel lens 93 concentrates incoming solar radiation 108 on a military or police target 110. Atmospheric turbulence is compensated by a control unit 112 which receives feedback signals from a photosensor array 114. Photosensor array 114 may be fixed to a support (not shown) in common with source 94 or 96 or may have a separate support structure, for example, a dedicated vehicle. In any case, using feedback signals from photosensor array 114, control unit 112 adapts the operation of optics 98 and 100 to real time atmospheric conditions. The feedback signals pertain to an image of a preselected point-source calibration object such as a star, a planet, the moon, a satellite, a marker balloon, or a beacon-carrying airplane. The calibration or reference object must be disposed on a side of an atmospheric target region 103 opposite photosensor array 114.

It is to be noted that the term "atmospheric lens" as used herein is intended to connote not an image forming lens but rather a refractive air volume of adequate structure to concentrate incoming solar rays upon a defined military or police target. Such a refractive air volume is preferably in the form of a Fresnel lens like structure. However, other shapes are also within the contemplation of the instant invention. For example, the heated or ionized air volume may have outwardly convex upper and lower boundaries.

Alternatively, the concentration of solar radiation on a collector may be accomplished by modulating the index of refraction in a predetermined region of the atmosphere to generate a diffraction pattern or volume serving to concentrate incoming radiation.

It is to be further noted that the radiation which is differentially focused in a predetermined pattern to produce the atmospheric lens may be any wavelength or range of wavelengths capable of being absorbed by one or more major atmospheric constituent molecules (e.g., water, carbon dioxide, oxygen, nitrogen, etc.) in sufficient quantities to effectuate a change in the refractive index of the air. For instance, microwave energy may be used.

In addition, the source or sources of the modulating radiation need not be on the earth's surface but may instead be located in hot air balloons or on satellites.

Although the invention has been described in terms of particular embodiments and applications, one of ordinary skill in the art, in light of this teaching, can generate additional embodiments and modifications without departing from the spirit of or exceeding the scope of the claimed invention. It is to be noted that a lens generating laser beam in accordance with the present invention may be provided with an intensity gradient by other techniques equivalent to the filtering technique described hereinabove with respect to FIG. 5. For example, a laser beam may be differentially expanded so that some portions of the beam have a higher intensity than other portions. Such differential expansion may be accomplished by forming expander 56 or 70 with an assymetric surface.

Accordingly, it is to be understood that the drawings and descriptions herein are preferred by way of example to facilitate comprehension of the invention and should not be construed to limit the scope thereof.

What is claimed is:

1. A method for using solar energy in police type actions, comprising the steps of:
   generating waveform energy;
   directing said energy to a predetermined region of the atmosphere located a pre-established distance above a surface of the earth;
   controlling said step of directing to modulate an index of refraction of air in said predetermined region of the atmosphere to produce a predetermined refraction index pattern in said region;
   modifying the distribution of solar radiation passing through said region to thereby concentrate the solar radiation at a preselected military or police target on said surface; and
   executing said steps of generating, controlling and modifying to control the total amount of solar radiation concentrated at said target to effectively disable said target.

2. The method defined in claim 1 wherein said waveform energy is electromagnetic radiation and said step of generating includes the step of generating said electromagnetic radiation via a laser, said step of controlling including the step of concentrating the laser generated radiation differentially through said region.

3. The device defined in claim 2 wherein said step of directing includes the step of transmitting laser radiation from a plurality of different sources to said region.

4. The method defined in claim 3 wherein said step of transmitting includes the step of transmitting the laser radiation simultaneously to the same point in said region, further comprising the step of phase locking said sources.

5. The method defined in claim 3 wherein said step of transmitting includes the step of transmitting laser beams from said sources to different points in said region at any one time.

6. The method defined in claim 2, further comprising the step of expanding a beam of laser radiation produced during said step of generating, said step of directing including the step of transmitting the expanded beam through the atmosphere to said region, said step of controlling including the step of focusing the expanded beam to a point in said region.

7. The method defined in claim 6 wherein said step of controlling includes the step of sweeping the focused beam along a predetermined path through said region.

8. The method defined in claim 7 wherein said step of controlling further includes the step of generating a power gradient within said beam, the focused beam having a corresponding gradient.

9. The method defined in claim 2 wherein said step of controlling includes the step of utilizing adaptive optics to compensate for refractive index changes induced by atmospheric turbulence in said region.

10. The method defined in claim 9 wherein said step of utilizing includes the step of iteratively changing orientations of a plurality of mirror segments disposed in a radiation transmission path between said laser and said region.

11. The device defined in claim 1 wherein said predetermined refraction index pattern is essentially an atmospheric lens in said region, said step of modifying including the step of refracting the incoming solar radiation through said lens.

12. The method defined in claim 11 wherein said step of controlling includes the step of controlling the index of refraction to produce a Fresnel type atmospheric lens.

13. The method defined in claim 1 wherein said step of controlling includes the step of differentially heating the air in said region.

14. The method defined in claim 13 wherein said step of differentially heating includes the step of controlling the heating to produce a Fresnel type atmospheric lens.

15. The method defined in claim 1 wherein said step of modulating includes the step of ionizing air in said region.

16. The method defined in claim 1 wherein said target is made at least partially of radiation absorbing material and contains human beings, said step of executing including the step of increasing a temperature inside said target so that said human beings are forced to evacuate said target.

17. The method defined in claim 16 wherein said target is a tank.

18. A method for using solar energy in police type actions, comprising the steps of:

modulating an index of refraction of air in a predetermined region of the atmosphere located a pre-established distance above a surface of the earth, thereby generating an atmospheric lens in said region;

refracting incoming solar radiation through said lens to concentrate the solar radiation at a predetermined military or police target on said surface; and controlling said steps of modulating and refracting to control the total amount of solar radiation concentrated at said target to effectively disable said target.

19. The method defined in claim 18 wherein said step of modulating includes the steps of:

generating at least one beam of laser radiation;

expanding said beam;

transmitting the expanded beam through the atmosphere to said region; and focusing the expanded beam to a point in said region.

20. The method defined in claim 19, further comprising the step of sweeping the focused beam along a predetermined path through said region.

21. The method defined in claim 28, further comprising the step of generating a power gradient within said beam, the focused beam having a corresponding gradient.

22. The method defined in claim 21 wherein said step of modulating includes the step of utilizing adaptive optics to compensate for atmospheric turbulence in a volume of air between a laser source and said region.

* * * * *